(12) United States Patent
Iizuka et al.

(10) Patent No.: US 11,630,195 B2
(45) Date of Patent: Apr. 18, 2023

(54) ESTIMATION METHOD, ESTIMATION DEVICE, AND PROGRAM

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1118 days.

(21) Appl. No.: 16/230,623

(22) Filed: Dec. 21, 2018

(65) Prior Publication Data

US 2019/0195997 A1 Jun. 27, 2019

(30) Foreign Application Priority Data

Dec. 26, 2017 (JP) .............................. JP2017-249695

(51) Int. Cl.
*G01S 13/04* (2006.01)
*G06M 11/00* (2006.01)
(Continued)

(52) U.S. Cl.
CPC .............. *G01S 13/04* (2013.01); *G01S 7/411* (2013.01); *G01S 7/415* (2013.01); *G01S 13/003* (2013.01);
(Continued)

(58) Field of Classification Search
CPC ........ G01S 13/003; G01S 13/04; G01S 13/52; G01S 7/411; G01S 7/415; G06M 11/00; H04B 7/0456
See application file for complete search history.

(56) References Cited

U.S. PATENT DOCUMENTS 10,912,493 B2 * 2/2021 Nakayama ............ A61B 5/1113
2017/0205502 A1 * 7/2017 Honma .................... G01S 13/46

FOREIGN PATENT DOCUMENTS

EP 3193189 A1 7/2017
JP 2000-171550 6/2000
(Continued)

OTHER PUBLICATIONS

D. Sasakawa, N. Honma, T. Nakayama and S. Iizuka, "Fast Living-Body Localization Algorithm for MIMO Radar in Multipath Environment," in IEEE Transactions on Antennas and Propagation, vol. 66, No. 12, pp. 7273-7281, Dec. 2018, doi: 10.1109/TAP.2018.2870405. (Year: 2018).*

(Continued)

*Primary Examiner* — Nader Bolourchi
(74) *Attorney, Agent, or Firm* — Greenblum & Bernstein, P.L.C.

(57) ABSTRACT

An estimation method is provided which includes: calculating a plurality of complex transfer functions, based on reception signals respectively received by N reception antenna elements during a predetermined period, the complex transfer functions each representing propagation characteristics between a transmission antenna element and the N reception antenna elements; extracting a variation component corresponding to each of the N reception antenna elements, from the calculated complex transfer functions, the variation component being caused by a living body; calculating a correlation matrix based on the variation component corresponding to each of the N reception antenna elements; calculating eigenvalues of the correlation matrix calculated in the calculating of the correlation matrix; and estimating the number of living bodies in a predetermined method, using the eigenvalues calculated in the calculating of the eigenvalues.

11 Claims, 11 Drawing Sheets

(51) Int. Cl.
    *G01S 7/41*         (2006.01)
    *G01S 13/00*       (2006.01)
    *G01S 13/52*       (2006.01)
    *H04B 7/0456*     (2017.01)

(52) U.S. Cl.
    CPC ............. *G01S 13/52* (2013.01); *G06M 11/00* (2013.01); *H04B 7/0456* (2013.01)

(56) References Cited

FOREIGN PATENT DOCUMENTS

| | | |
|---|---|---|
| JP | 2009-281775 | 12/2009 |
| JP | 2013152239 | 8/2013 |
| JP | 2013-186072 | 9/2013 |
| JP | 2015-117972 | 6/2015 |

OTHER PUBLICATIONS

Office Action dated Apr. 27, 2021 and issued in Japanese patent application No. 2017-249695 and corresponding English translation.

An Extended European Search Report dated Jun. 6, 2019 issued for Europeanl patent application No. 18212645.8.

\* cited by examiner

ESTIMATION METHOD, ESTIMATION DEVICE, AND PROGRAM

CROSS REFERENCE TO RELATED APPLICATION

This application claims the benefit of priority of Japanese Patent Application Number 2017-249695 tiled on Dec. 26, 2017, the entire content of which is hereby incorporated by reference.

BACKGROUND

1. Technical Field

The present disclosure relates to an estimation method, an estimation device, and a program, which use a wireless signal.

2. Description of the Related Art

There is a technique that detects an object using a wireless signal for example, Japanese Unexamined Patent Application Publication No. 2009-281775 and Japanese Unexamined Patent Application Publication No. 2000-171550). Japanese Unexamined Patent Application Publication No. 2009-281775 discloses a technique that determines an autocorrelation matrix of reception signals, and obtains the number of targets, based on the magnitude of eigenvalues of the autocorrelation matrix. In addition, Japanese Unexamined Patent Application Publication No. 2000-171550 discloses a technique that obtains the nut be of targets, by performing eigenvalue decomposition on a correlation matrix of reception signals and counting the number of eigenvalues greater than or equal to a threshold.

SUMMARY

However, the techniques described in Japanese Unexamined Patent Application Publication No. 2009-281775 and Japanese Unexamined Patent Application. Publication No, 2000-171550 are not capable of detecting presence/absence by extracting only a living body, and thus have a problem that it is not possible to figure out the number of living bodies present in a target space.

The present disclosure has been conceived in view of the above-described circumstances. An object of the present disclosure is to provide an estimation method, an estimation device, and a program which enable estimation of the number of living bodies, etc., which are present in a target space, by using a wireless signal.

In order to achieve the above-described object, an estimation method according to an aspect of the present disclosure is an estimation method of estimating the number of living bodies that are present in a space and include at least one living body, the estimation method using (i) a transmission unit including at least one transmission antenna element and (ii) a reception unit including N reception antenna elements where N is a natural number greater than or equal to two, the estimation method including: calculating a plurality of complex transfer functions, based on reception signals respectively received by the N reception antenna elements during a predetermined period, the plurality of complex transfer functions each representing propagation characteristics between the at least one transmission antenna element and the N reception antenna elements; extracting a variation component corresponding to each of the N reception antenna elements, from the plurality of complex transfer functions calculated in the calculating of the plurality of complex transfer functions, the variation component being caused by a living body; calculating a correlation matrix based on the variation component corresponding to each of the N reception antenna elements extracted in the extracting; calculating eigenvalues of the correlation matrix calculated in the calculating of the correlation matrix; and estimating the number of living bodies in a predetermined method, using the eigenvalues calculated in the calculating of the eigenvalues.

According to the present disclosure, it is possible to estimate the number of living bodies, etc., which are present in a target space, by using a wireless signal.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
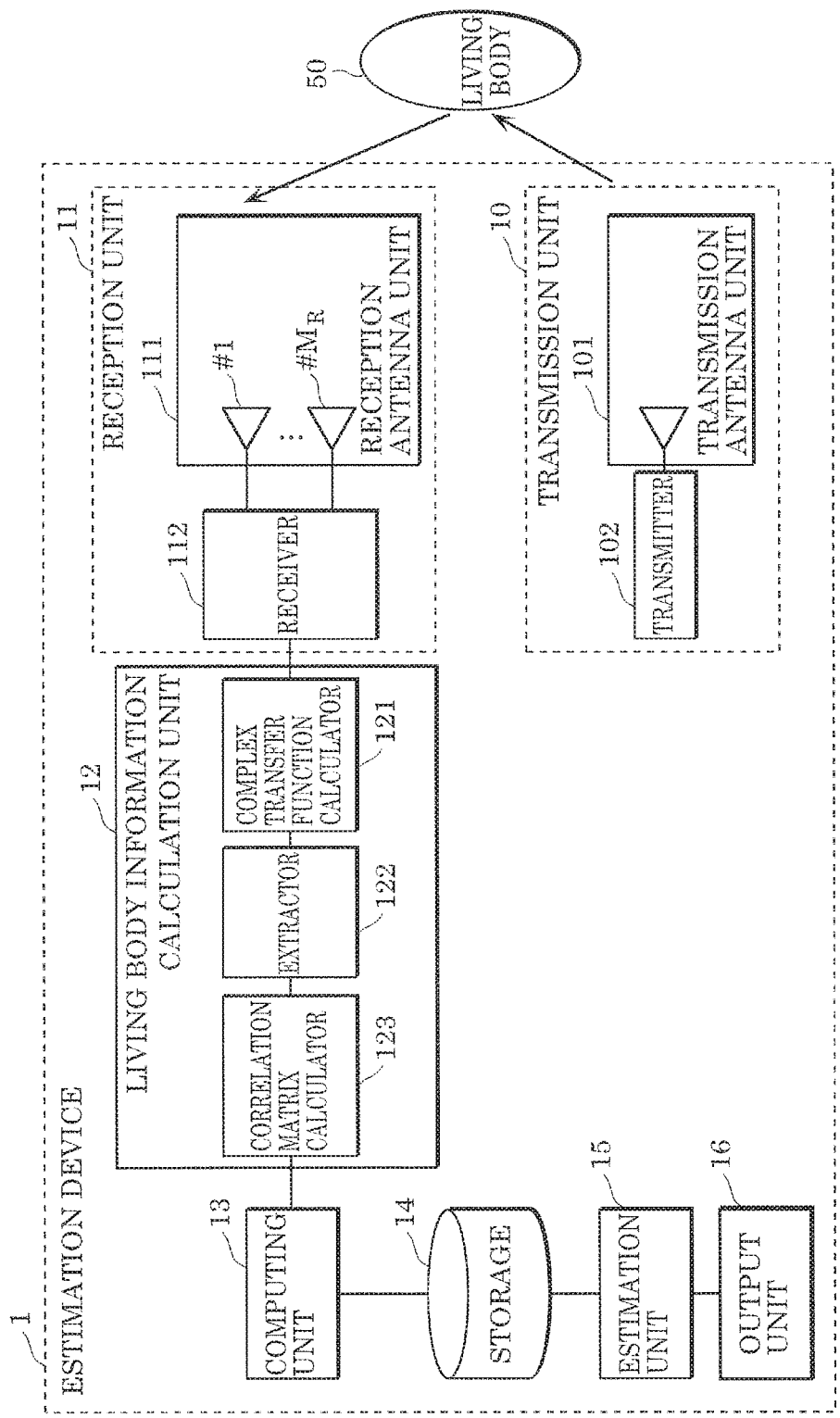
FIG. 1 is a block diagram which illustrates one example of the configuration of an estimation device according to Embodiment 1.

An estimation method according to an aspect of the present disclosure is an estimation method of estimating the number of living bodies that are present in a space and include at least one living body, the estimation method using (i) a transmission unit including at least one transmission antenna element and (ii) a reception u including N reception antenna elements where N is a natural number greater than or equal to two, the estimation method including: calculating a plurality of complex transfer functions, based on reception signals respectively received by the N reception antenna elements during a predetermined period, the plurality of complex transfer functions each representing propagation characteristics between the at least one transmission antenna element and the N reception antenna elements; extracting a variation component corresponding to each of the N reception antenna elements, from the plurality of complex transfer functions calculated in the calculating of the plurality of complex transfer functions, the variation component being caused by a living body; calculating a correlation matrix based on the variation component corresponding to each of the N reception antenna elements extracted in the extracting; calculating eigenvalues of the correlation matrix calculated in the calculating of the correlation matrix; and estimating the number of living bodies in a predetermined method, using the eigenvalues calculated in the calculating of the eigenvalues.

With this, it is possible to estimate the number of living bodies, etc., which are present in a target space, by using a wireless signal.

Here, for example, in the estimating of the number of living bodies, the number of living bodies is estimated based on a feature of an eigenvalue distribution in which the eigenvalues calculated in the calculating of the eigenvalues are sorted by magnitude.

In addition, for example, the eigenvalue distribution may ratio information indicating a ratio or difference between adjacent eigenvalues among the eigenvalues calculated in the calculating of the eigenvalues when the eigenvalues are sorted by magnitude, the feature may be whether the ratio or difference included in the ratio information at an xth eigenvalue from a largest eigenvalue is greater than or equal to a predetermined value, where x is a natural number, and in the estimating of the number of living bodies, the number of living bodies may be estimated to be the natural number indicated by x.

In addition, for example, in the calculating of the eigenvalues, the eigenvalues of the correlation matrix calculated in the calculating of the correlation matrix at each of consecutive time points may be calculated, and eigenvectors respectively corresponding to the eigenvalues of the correlation matrix at the consecutive time point may be calculated, and in the estimating of the number of living bodies, the number of living bodies may be estimated based on change information regarding the eigenvectors calculated in the calculating of the eigenvalues, the change information being obtained comparing corresponding eigenvectors at the consecutive time points, among the eigenvectors.

In addition, for example, the change information may indicate whether a change in a direction of each of the corresponding eigenvectors at the consecutive time points is greater than or less than a predetermined value, and in the estimating of the number of living bodies, the number of living bodies may be estimated, based on the change information, to be the number of eigenvectors having the change in the direction less than the predetermined value.

In addition, for example, the estimation method may further include: outputting absence information indicating absence of a living body in the space when the number of living bodies estimated in the estimating of the number of living bodies is zero.

With this, it is possible to perform presence absence estimation which indicates whether or not a living body is present in a target space, by using a wireless signal.

In addition, for example, when the number of living bodies continues to be estimated to be an identical number for at least a predetermined period of time in the estimating of the number of living bodies, the estimation method may further include outputting the identical number as the number of living bodies.

With this, it is possible to enhance accuracy of estimation of the number of living bodies, etc., which are present in a target space, by using a wireless signal.

In addition, for example, when the transmission unit includes two or more transmission antenna elements each being the at least one transmission antenna element, the estimation method may further include estimating a location of the at least one living body by estimating, at least twice, a direction in which the at least one living body is present, relative to a location of the reception unit, using the correlation matrix calculated in the calculating of the correlation matrix and the number of living bodies estimated in the estimating of the number of living bodies.

With this, it is possible to estimate a living body location which is a location of a living body that is present in a target space, by using a wireless signal.

In addition, for example, in the estimating of the location, the location of the at least one living body may be continuously tracked for a predetermined duration, by continuously performing the estimating of the location for the predetermined duration.

With this, it is possible to know, in real time, a living body location of a living body that is present in a target space, by using a wireless signal.

In addition, an estimation device according to an aspect of the present disclosure is an estimation device which estimates the number of living bodies that are present in a space and include at least one living body, and includes (i) a transmission unit including at least one transmission antenna element and (ii) a reception unit including N reception antenna elements where N is a natural number greater than or equal to two. The estimation device includes: a complex transfer function calculator which calculates a plurality of complex transfer functions, based on reception signals respectively received by the N reception antenna elements during a predetermined period, the plurality of complex transfer functions each representing propagation characteristics between the at least one transmission antenna element and the N reception antenna elements; an extractor which extracts a variation component corresponding to each of the N reception antenna elements, from the plurality of complex transfer functions calculated by the complex transfer function calculator, the variation component being caused by a living body; a correlation matrix calculator which calculates a correlation matrix based on the variation component corresponding to each of the N reception antenna elements extracted by the extractor; a computing unit configured to calculate eigenvalues of the correlation matrix calculated by the correlation matrix calculator; and an estimation unit configured to estimate the number of living bodies in a predetermined method, using the eigenvalues calculated by the computing unit.

It should be noted that the present disclosure can be implemented not only as a device, but also as an integrated circuit including processing units that are included by such a device, as a i method including, as steps, the processing units included by the device, as a program causing a computer to execute the steps, or as information, data, or a signal indicating the program. Furthermore, the program, the information, the data and the signal may be distributed via a recording medium such as a CD-ROM, or a communication medium such as the Internet.

Hereinafter, an embodiment of the present disclosure will be described in detail with reference to the drawings. It should be noted that each of the embodiments described below shows one specific example of the present disclosure. The numerical values, shapes, materials, structural components, the arrangement and connection of the structural components, steps, the processing order of the steps, etc. shown in the following embodiments are mere examples, and therefore do not limit the scope of the Claims of the present disclosure. Furthermore, among the structural components in the following exemplary embodiment, structural components not recited in any one of the independent claims indicating the broadest concepts of the present disclosure are described as arbitrary structural components included in an embodiment. In the specification and the drawings, structural components having substantially identical functions are assigned with the same reference signs, and overlapping description thereof is omitted.

Embodiment 1

The following describes estimation of the number of living bodies with reference to the drawings. The estimation of the number of living bodies is performed by observing a correlation matrix of reception signals using a transmission unit and a reception unit of a single input multiple output (SIMO) configuration, and estimating the number of living bodies which are present in a detection target space in a predetermined method, using eigenvalues of the correlation matrix.

[Configuration of Estimation Device 1]

FIG. 1 is a block diagram which illustrates one example of the configuration of estimation device 1 according to Embodiment 1. FIG. I also illustrates a living body that is a detection target of estimation device 1 illustrated in FIG. 1.

Estimation device 1 according to Embodiment 1 estimates the number of living bodies that are present in a detection target space and include at least one living body, using (i) a transmission unit including at least one transmission antenna element, and (ii) a reception unit including N reception antenna elements (N is a natural number greater than or equal to two).

Estimation device 1 according to Embodiment 1 includes: transmission unit 10; reception unit 11; living body information calculation unit 12; computing unit 13; storage 14; estimation unit 15; and output unit 16.

(Transmission Unit 10)

Transmission unit 10 includes transmission antenna unit 101 and transmitter 102.

Transmission antenna unit 101 includes one transmission antenna element.

Transmitter 102 generates a high-frequency signal. Transmitter 102 transmits a transmission signal that is the generated signal, from one transmission antenna element included by transmission antenna unit 101. Although transmitter 102 transmits a sine wave of 2.45 GHz, for example, in an example described in the present embodiment, the present disclosure is not limited to this example. A transmission signal may be transmitted using any other frequencies and modulation methods.

(Reception Unit 11)

Reception unit 11 includes reception antenna unit 111 and receiver 112.

Reception antenna unit 111 includes N reception antenna elements (N is a natural number greater than or equal to two). In the following description, reception antenna unit 111 according to the present embodiment; includes, for example, $M_R$ antenna elements ($M_R$ is an integer greater than or equal to two) from #1 to #$M_R$ as illustrated in FIG. 1. In reception antenna unit 111, each of the $M_R$ reception antenna elements receives reception signals which are transmitted from one transmission antenna element, and include a signal reflected by living body 50 when living body 50 is present.

Receiver 112 observes (i.e., receives) reception signals during a predetermined period, at each of the N reception antenna elements. More specifically, as illustrated in FIG. 1, receiver 112 converts high-frequency signals received by each of the $M_R$ reception antenna elements during the predetermined period, into low-frequency signals which can be subjected to signal processing. Receiver 112 transmits the low-frequency signals obtained by the converting, to living body information calculation unit 12.

(Living body Information Calculation Unit 12)

Living body information calculation unit 12 includes, as illustrated in FIG. 1, complex transfer function calculator 121, extractor 122, and correlation matrix calculator 123, and calculates living body information based on the signal transmitted from reception unit 11.

(Complex Transfer Function Calculator 121)

Complex transfer function calculator 121 calculates, based on the reception signals respectively received by the N reception antenna elements during the predetermined period, a plurality of complex transfer functions each representing propagation characteristics between the transmission antenna element and the N reception antenna elements. More specifically, complex transfer function calculator 121 calculates complex transfer functions each representing propagation characteristics between one transmission antenna element and $M_R$ reception antenna elements, based on the low-frequency signals transmitted from reception unit 11. The following provides more detailed explanation, with reference to FIG. 2.

Figure 2:
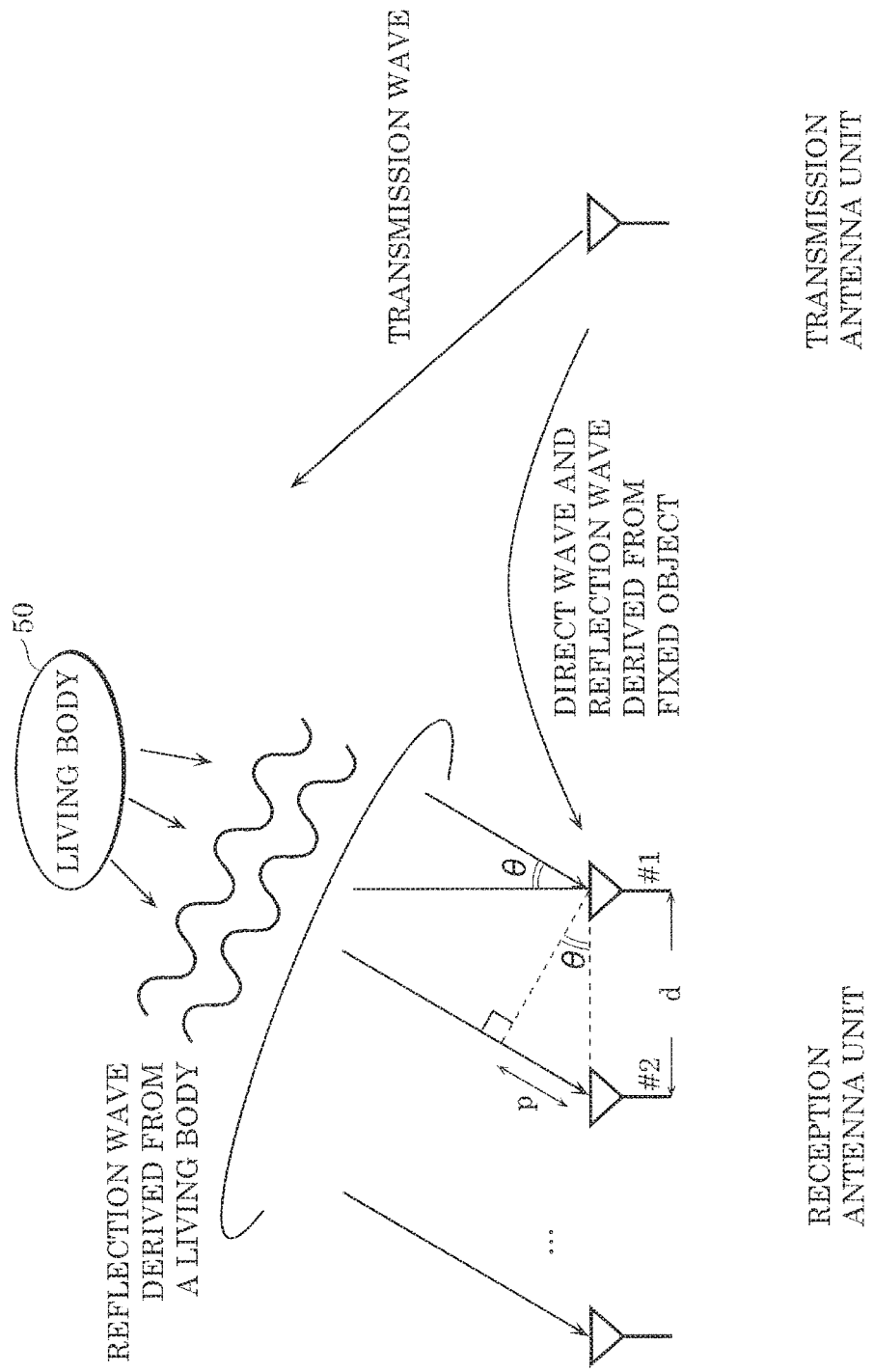
FIG. 2 is a diagram which conceptually illustrates a state in which signal waves are transferred using the estimation device illustrated in FIG. 1.

FIG. 2 is a diagram which conceptually illustrates a state in which, signal waves are transmitted using estimation device 1 illustrated, in FIG. 1. As illustrated in FIG. 2, a portion of the transmission wave transmitted from the transmission antenna element of transmission antenna unit 101 is reflected by living body 50 to reach a reception array antenna of reception antenna unit 111. Here, reception antenna unit 111 is a reception array antenna including $M_R$ reception antenna elements each of which is disposed in a linear array at an interval d. In addition, a direction of living body 50 when viewed from the front of reception antenna unit 111 is denoted as θ.

It is assumed that a distance between living body 50 and reception antenna unit 111 is sufficiently large and a reflection wave which is derived from a living body and arrives at reception antenna unit 111 can be considered as a plane wave. Complex transfer function calculator 121 is capable of calculating complex transfer function vectors representing propagation characteristics between the transmission antenna element and the $M_R$ reception antenna elements, based on complex reception signal vectors observed using the $M_R$ reception antenna elements.

(Extractor 122)

Extractor 122 extracts, from the plurality of complex transfer functions calculated by complex transfer function calculator 121, a variation component corresponding to each of the N reception antenna elements, which is caused by a living body. More specifically, extractor 122 records, in chronological order, the complex transfer functions calculated by complex transfer function calculator 121, and extracts a variation component caused by a living body among variations of the complex transfer functions. Here, as the method of extracting a variation component caused by a living body, a method of extracting only a component corresponding to a vibration of a living body after a reception signal is converted to a frequency region using, for example, Fourier conversion, a method of calculating a difference between complex transfer functions at two different time points, or the like can be used. By performing these methods, a complex transfer function representing propagation characteristics when a signal ravels via a fixed object other than living body 50 is removed, and only a complex transfer function component when a signal travels via living body 50 is left. It should be noted that, since there are a plurality of reception antenna elements, there are also a plurality of components of complex transfer functions corresponding to the reception antenna elements when signals travel via living body 50. These are collectively defined as a living-body-component channel vector.

(Correlation Matrix Calculator 123)

Correlation matrix calculator 123 calculates a correlation matrix based on a variation component corresponding to each of the N reception antenna elements which is extracted by extractor 122. More specifically, correlation matrix calculator 123 calculates correlation matrix $R_i$ of a living-body-component channel vector, which includes a plurality of complex transfer function components that are variation component when signals travel via living body 50.

(Computing Unit 13)

Computing unit 13 calculates eigenvalues of the correlation matrix calculated by correlation matrix calculator 123. More specifically, computing unit 13 calculates eigenvalues of correlation matrix $R_i$ calculated by correlation matrix calculator 123. Computing unit 13 causes storage 14 to store the calculated eigenvalues of correlation matrix $R_i$.

(Storage 14)

Storage 14 is configured by hard disk drive (HDD), a memory, or the like. In storage 14, a calculation result of computing unit 13, data for use in estimation processing performed by estimation unit 15, etc. are stored.

(Estimation Unit 15)

Estimation unit 15 estimates the number of living bodies in a predetermined method, using eigenvalues calculated by computing unit 13. For example, estimation unit 15 estimates the number of living bodies based on a feature of an eigenvalue distribution in which the plurality of eigenvalues calculated by computing unit 13 are sorted by magnitude. Here, the eigenvalue distribution is ratio information which indicates a ratio or difference between adjacent eigenvalues when the plurality of eigenvalues calculated by computing unit 13 are sorted by magnitude. The feature may be whether the ratio or difference included in the ratio information at the xth eigenvalue from the largest eigenvalue is greater than or equal to a predetermined value, where x is a natural number.

In this case, estimation unit 15 may estimate the number of living bodies to be the natural number indicated by x.

Figure 3:
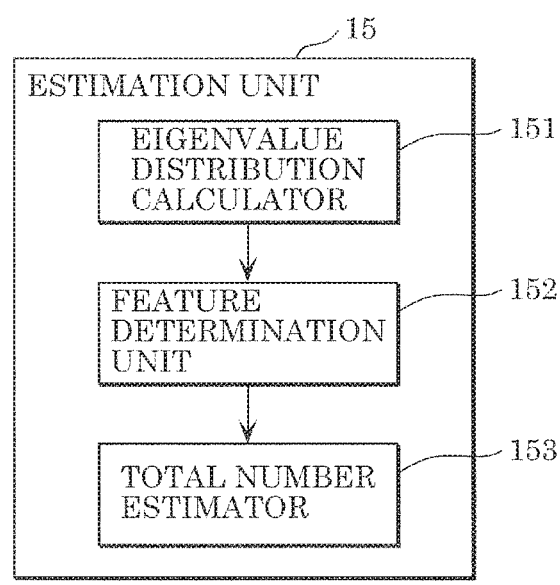
FIG. 3 is a block diagram which illustrates one example of the detailed configuration of an estimation unit illustrated in FIG. 1.

FIG. 3 is a block diagram which illustrates one example of the detailed configuration of estimation unit 15 illustrated in FIG. 1.

According to the present embodiment, estimation unit 15 includes: eigenvalue distribution calculator 151; feature determination unit 152; and total number estimator 153, as illustrated in FIG. 3.

(Eigenvalue Distribution Calculator 151)

Figure 4:
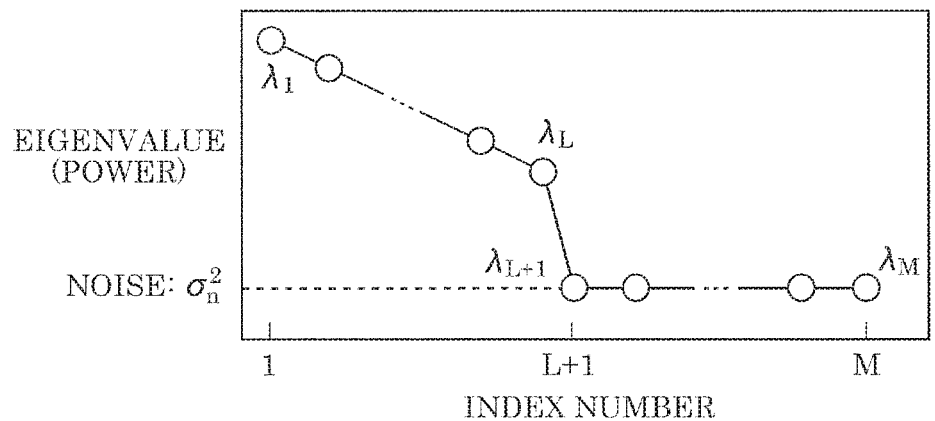
FIG. 4 is a diagram which illustrates one example of an eigenvalue distribution calculated by an eigenvalue distribution calculator illustrated in FIG. 3.

Eigenvalue distribution calculator 151 calculates an eigenvalue distribution, in which the plurality of eigenvalues calculated by computing unit 13 are sorted by magnitude. Eigenvalue distribution calculator 151 may calculate, for example, an eigenvalue distribution illustrated in FIG. 4 or FIG. 5. Here, FIG. 4 and FIG. 3 are each a diagram which illustrates one example of the eigenvalue distribution calculated by eigenvalue distribution calculator 151 illustrated in FIG. 3. In FIG. 4, the vertical axis indicates an eigenvalue and the horizontal axis indicates an eigenvalue number when the largest eigenvalue is the first eigenvalue. It should be noted that a value corresponding to noise such as thermal noise is indicated by a dashed line in FIG. 4. In addition, in FIG. 5, the vertical axis indicates an eigenvalue ratio, and the horizontal axis indicates a ratio number of an eigenvalue when a ratio of the largest eigenvalue to the next greatest eigenvalue is the first ratio, in the case where a plurality of eigenvalues are sorted by magnitude. In other words, in the eigenvalue distribution illustrated in FIG. 5, ratio information which indicates a ratio of adjacent eigenvalues when the plurality of eigenvalues calculated by computing unit 13 are sorted by magnitude is indicated. Here, a ratio is calculated, for example, by $\lambda_i/\lambda_{i+1}$ (i is a natural number).

It should be noted that, in the eigenvalue distribution, ratio information which indicates a difference between adjacent eigenvalues when a plurality of eigenvalues calculated are sorted by magnitude may be indicated.

(Feature Determination Unit 152)

Feature determination unit 152 determines a feature of the eigenvalue distribution calculated by eigenvalue distribution calculator 151. Feature determination unit 152 determines, for example, a number at which a ratio significantly changes, as a feature of the eigenvalue distribution. More specifically, feature determination unit 152 determines a number at which an eigenvalue ratio is greater than or equal to a predetermined value, as a feature. For example, in the example illustrated in FIG. 5, the number that corresponds to the eigenvalue ratio enclosed by a solid line circle is determined as a feature. In this manner, feature determination unit 152 searches for a location of an eigenvalue which precipitously decreases, by using the eigenvalue distribution.

Figure 6:
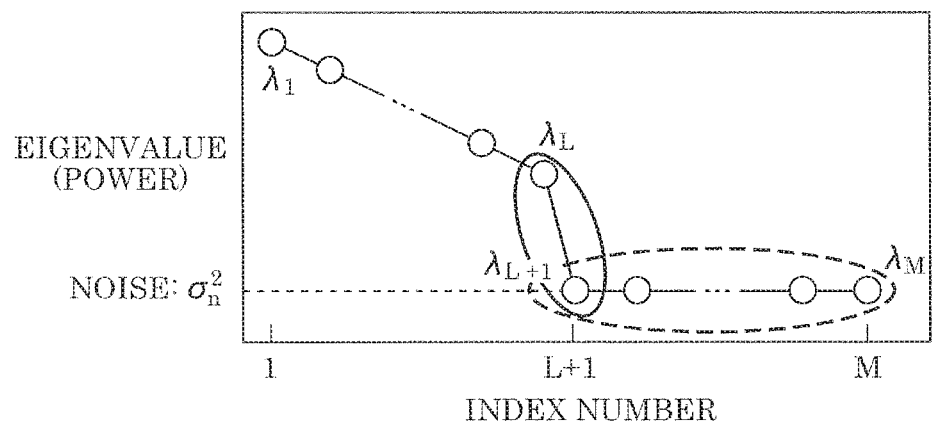
FIG. 6 is a diagram which illustrates another example of a feature of the eigenvalue distribution determined by a feature determination unit illustrated in FIG. 3.

FIG. 6 is a diagram which illustrates another example of a feature of the eigenvalue distribution determined by feature determination unit 152 illustrated in FIG. 3.

Feature determination unit 152, as illustrated for example by the eigenvalues enclosed by the solid line circle and the eigenvalues enclosed by the dotted line circle in FIG. 6, may determine number L as a feature of the eigenvalue distribution, based on the fact that the value of eigenvalue $\lambda_{L+1}$ at number L+1 precipitously changes. Stated differently, feature determination unit 152 may determine, as a feature, the number of eigenvalues L which are greater than or equal to a threshold determined as a magnitude of the eigenvalue corresponding to thermal noise, in the eigenvalue distribution illustrated in FIG. 6. However, in general, since it is difficult to determine the boundary between eigenvalue $\lambda_L$ at number L and eigenvalues from $\lambda_{L+1}$ to $\lambda_M$ at or after number L+1 which indicate thermal noise, a feature determination is thought to be better performed by using the above-described ratio or difference.

(Total Number Estimator 153)

Total number estimator 153 may estimate the number of living bodies to be the natural number indicated by x that is the number determined as a feature by feature determination unit 152. Total number estimator 153 may also estimate the number of living bodies to be "L" that is determined as a feature by feature determination unit 152 in the eigenvalue distribution illustrated in FIG. 5. Here, "L" refers to the Lth eigenvalue from the largest eigenvalue, and thus L eigenvalues among M eigenvalues are different from the eigenvalue corresponding to thermal noise. In addition, "L" corresponds to the number of living bodies.

It should be noted that total number estimator 153 may estimate the number of living bodies to be the number of eigenvalues which are greater than or equal to a threshold determined as a magnitude of the eigenvalue corresponding to thermal noise, in the eigenvalue distribution illustrated in FIG. 6.

In addition, total number estimator 153 may obtain an average value or median value of the number of living bodies from the results of estimation previously performed several times, and estimate the determinate number of living bodies to be the obtained average value or median value. This is because, when a great amount of noise is inputted to reception unit 11 due to the presence of a wireless device other than transmission unit 10 and reception unit 11 included by estimation device 1, it is possible to average the influence of the noise.

(Output unit 16)

Output unit 16 may output absence information which indicates that a living body is not present in a detection target space when the number of living bodies estimated by estimation unit 15 is zero. In addition, when estimation unit 15 continues to estimate an identical number of living bodies for at least a predetermined period of time, output unit 16 may output the identical, number of living bodies.

(Operations of Estimation Device 1)

Next, operations of estimation device 1 configured as described above will be described.

Figure 7:
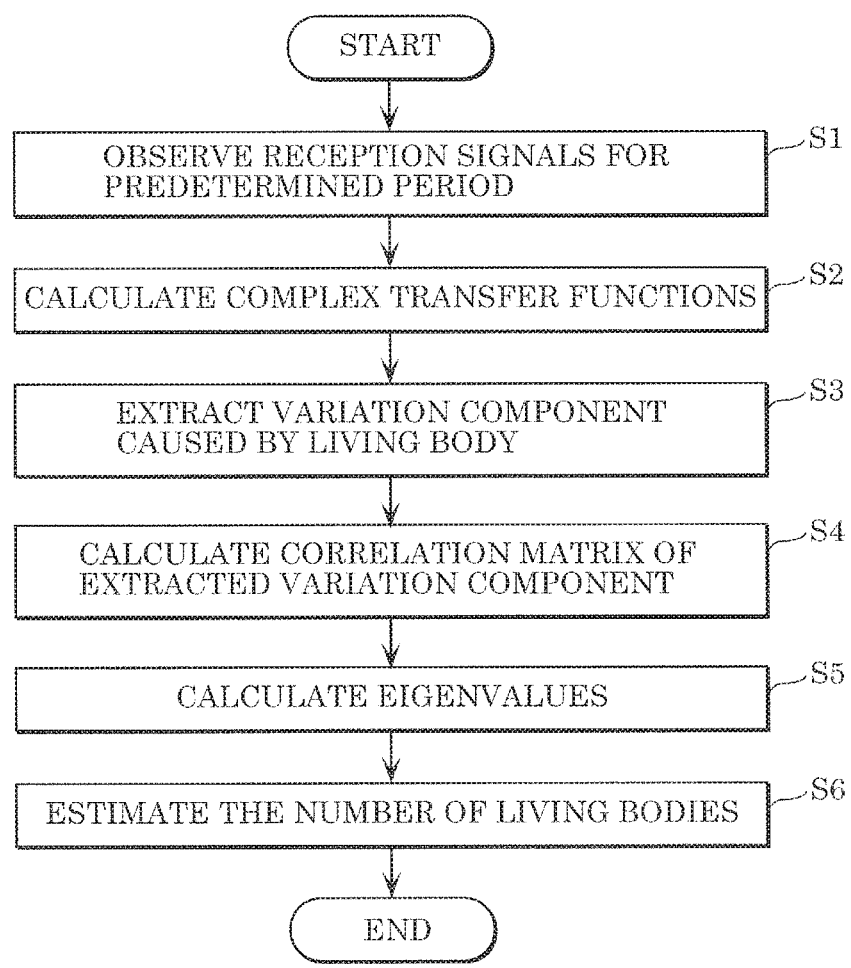
FIG. 7 is a flowchart which illustrates estimation processing performed by the estimation device according to Embodiment 1.

FIG. 7 is a flowchart which illustrates estimation processing performed by estimation device 1 according to Embodiment 1.

First, estimation device 1 observes reception signals for a predetermined period (S1). More specifically, estimation device 1 observes, during a predetermined period, reception signals which are transmitted from one transmission antenna element, and include a reflection signal reflected by living body 50 when living body 50 is present.

Next, estimation device 1 calculates complex transfer functions based on the reception signals observed in Step S1 (S2). More specifically, estimation device 1 calculates, base the reception signals respectively received by N reception antenna elements during a predetermined period, a plurality of complex transfer functions representing propagation characteristics between the transmission antenna element and the N reception antenna elements. The details are as described in the forgoing description, and as such, description thereof will be omitted. The same applies hereafter.

Next, estimation device 1 extracts, from the plurality of complex transfer functions calculated in Step S2, a variation component caused by a living body (S3). More specifically, estimation device 1 extracts, from the plurality of complex transfer functions calculated in Step S2, a variation component corresponding to each of the N reception antenna elements, which is caused by a living body.

Next, estimation device 1 calculates a correlation matrix of variation components extracted in Step S3 (S4). More specifically, estimation device 1 calculates a correlation matrix based on the variation component corresponding to each of the N reception antenna elements extracted in Step S3.

Next, estimation device 1 calculates eigenvalues of the correlation matrix calculated in Step S4 (S5). More specifically, estimation device 1 calculates eigenvalues of the correlation matrix calculated in Step S4.

Next, estimation device 1 estimates the number of living bodies, using the eigenvalues calculated in Step S5 (S6). More specifically, estimation device 1 estimates the number of living bodies in a predetermined method, using the eigenvalues calculated in Step S5.

Figure 8:
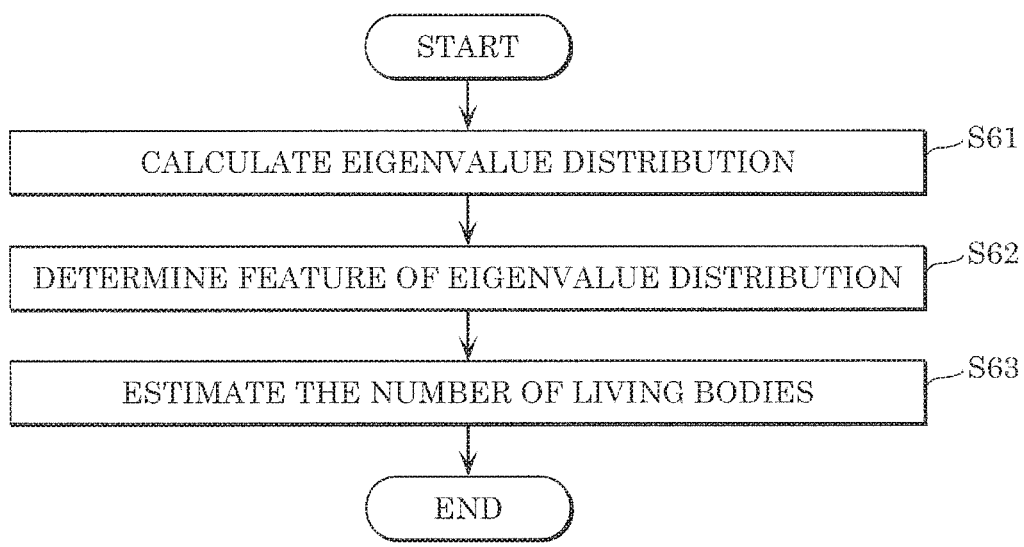
FIG. 8 is a flowchart which illustrates one example of detailed processes of step S6 illustrated in FIG. 7.

FIG. 8 is a flowchart which illustrates one example of detailed processes of step S6 illustrated in FIG. 7.

Figure 5:
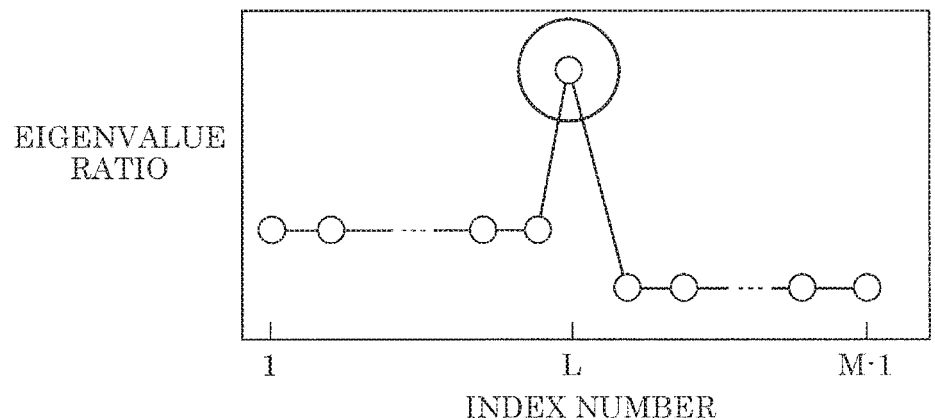
FIG. 5 is a diagram which illustrates one example of the eigenvalue distribution calculated by the eigenvalue distribution calculator illustrated in FIG. 3.

In Step S6, estimation device 1 first calculates an eigenvalue distribution (S61). More specifically, estimation device 1 calculates an eigenvalue distribution in which the plurality of eigenvalues calculated in Step S5 are sorted by magnitude. For example, in the eigenvalue distribution, ratio information which indicates a ratio of adjacent eigenvalues when the calculated eigenvalues are sorted, by magnitude may be indicated, as illustrated in FIG. 5.

Next, estimation device 1 determines a feature of the eigenvalue distribution calculated in Step S61 (S62). More specifically, estimation device 1 searches for a location of an eigenvalue which precipitously decreases, by using the eigenvalue distribution calculated in Step S61, thereby determining, as a feature, the number at which an eigenvalue ratio is greater than or equal to a predetermined value, as illustrated in FIG. 5, for example.

Next, estimation device 1 estimates the number of living bodies that is the number of people present in a detection target space, based on the feature determined in Step S62 (S63). For example, in the example illustrated in FIG. 5, estimation device 1 estimates the number of living bodies to be "L" that is determined as the feature in Step S62.

(Variation)

In the above-described Embodiment 1, a method (hereinafter also referred to as a ratio method) which uses ratio information indicating a ratio or difference between adjacent eigenvalues when calculated eigenvalues are sorted by magnitude is described as a predetermined method for estimating the number of living bodies. However, the predetermined method for estimating the number of living bodies is not limited to this example. As the predetermined method, a change in the direction of corresponding eigenvectors at different time points (hereinafter also referred to as an eigenvector variation searching method) may be used. This case will be described as a variation.

(Configuration of Estimation Device 1 of Variation)

Estimation device 1 according to the present variation is different from estimation device 1 of Embodiment 1 in the configurations of computing unit 13A and estimation unit 15A. Estimation device 1 according to the present variation will be described below with a focus on the differences from Embodiment 1.

(Computing Unit 13A)

Figure 9:
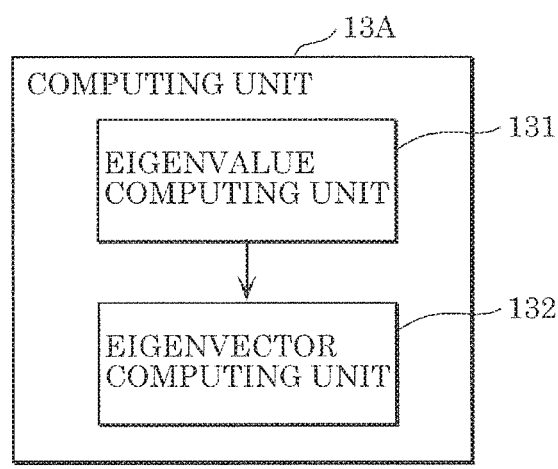
FIG. 9 is a block diagram which illustrates one example of the detailed configuration of a computing unit according to a variation.

FIG. 9 is a block diagram which illustrates one example of a detailed configuration of computing unit 13A according to the variation.

Computing unit 13A includes eigenvalue computing unit 131 and eigenvector computing unit 132 as illustrated in FIG. 9, and calculates eigenvalues and eigenvectors of a correlation matrix calculated by correlation matrix calculator 123.

(Eigenvalue Computing Unit 131)

Eigenvalue computing unit 131 calculates eigenvalues of a correlation matrix at each of consecutive time points which has been calculated by correlation matrix calculator 123. More specifically, eigenvalue computing unit 131 calculates eigenvalues of correlation matrix $R_i$ of living-body-component channel vectors at each of consecutive time points which has been calculated by correlation matrix calculator 123. Here, the consecutive time points have intervals of 0.1 seconds, for example, so as not to be affected by a vibration or movement of a living body.

(Eigenvector Computing Unit 132)

Eigenvector computing unit 132 calculates eigenvectors for the respective eigenvalues of the correlation matrix at the each of the time points, which have been calculated by eigenvalue computing unit 131. More specifically, eigenvector computing unit 132 calculates eigenvectors for the respective eigenvalues of correlation matrix $R_i$ at each of the time points, which have been calculated by eigenvalue, computing unit 131. For example, eigenvector computing unit 132 performs eigenvalue decomposition as indicated by (Equation 1) below, on correlation matrix $R_i$ of living-body-component channel vectors at time point t, thereby calculating eigenvector U(t) at time point t.

Here, eigenvector U(i) at time point i at which observation is performed can be expressed using (Equation 1) to (Equation 3). In (Equation 1), H is an operator representing Hermitian matrix.

[Math. 1]

$$R_i = U_i \Lambda_i U_i^H \quad \text{(Equation 1)}$$

[Math. 2]

$$U_i = [U_1, \ldots, U_L, U_{L+1}, \ldots, U_{M_R}] \quad \text{(Equation 2)}$$

[Math. 3]

$$\Lambda_i = \text{diag}[\lambda_1, \ldots, \lambda_L, \lambda_{L+1}, \ldots, \lambda_{M_R}]. \quad \text{(Equation 3)}$$

Eigenvector computing unit 132 causes storage 14 to store eigenvector matrix U(t) which has been calculated, together with the time point at which the observation is performed.

(Estimation Unit 15A)

Estimation unit 15A estimates the number of living bodies based on change information regarding the plurality of eigenvectors calculated by computing unit 13A. The change information is obtained by comparing corresponding eigenvectors at a plurality of time points.

Figure 10:
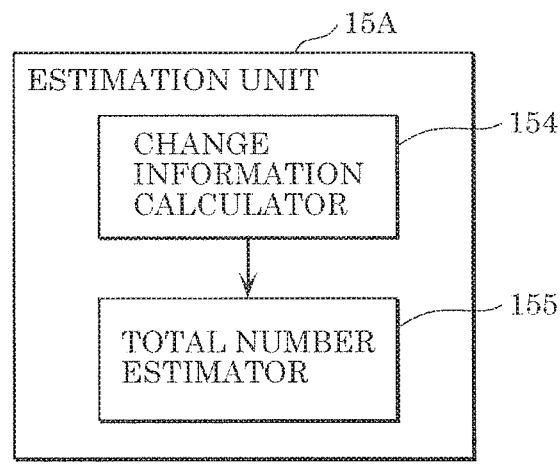
FIG. 10 is a block diagram which illustrates one example of the detailed configuration of an estimation unit according to the variation.

FIG. 10 is a block diagram which illustrates one example of a detailed configuration of estimation unit 15A according to the variation.

Estimation unit ISA includes change information calculator 154 and total number estimator 155, as illustrated in FIG. 10.

(Change Information Calculator 154)

Figures 11, 12:
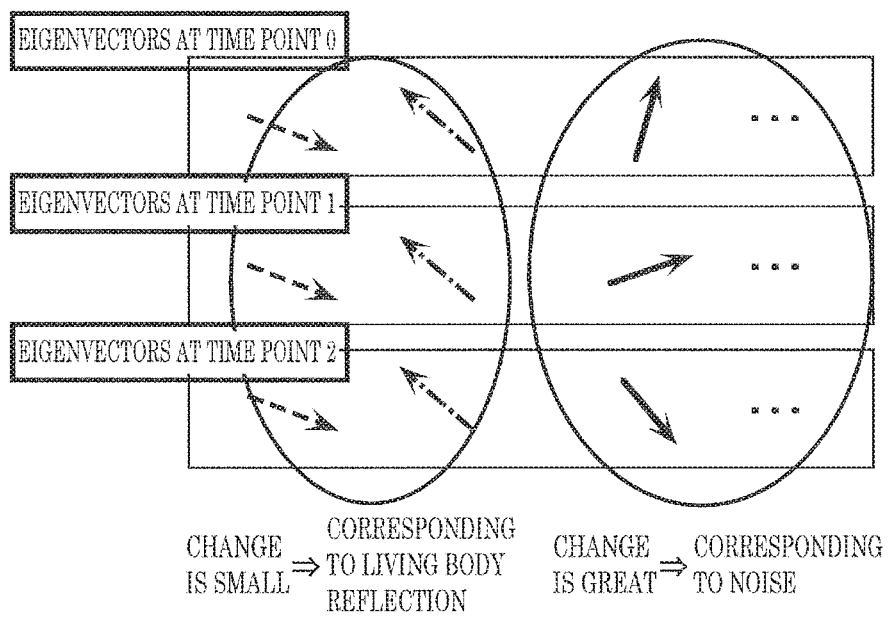
FIG. 11 is a diagram which illustrates one example of mapping of a plurality of eigenvectors at a plurality of time points according to the variation.
FIG. 12 is a diagram which explains calculating, for each row, a sum of inner products of eigenvectors at two different time points, according to the variation.

Change information calculator 154 calculates change information regarding the plurality of eigenvectors calculated by computing unit 13A. The change information is information that indicates whether a change in a direction of each of the plurality of corresponding eigenvectors at a plurality of time points is greater than or smaller than a predetermined value. For example, in order to compare the directions of a plurality of corresponding eigenvectors at a plurality of time points as illustrated in FIG. 11, change information calculator 154 may set a mapping in which a plurality of eigenvectors respectively at a plurality of time points are arranged, and the corresponding eigenvectors at the plurality of time points are arranged at corresponding locations Here, FIG. 11 is a diagram which illustrates one example of mapping of a plurality of eigenvectors respectively at a plurality of time points according to the variation. FIG. 11 illustrates one example of mapping in which a plurality of eigenvectors at time points 0, 1, and 2 are arranged in a horizontal direction, and the corresponding eigenvectors at time points 0, 1, and 2 are arranged vertically at the same locations. The change information illustrated in FIG. 11 indicates that, when the plurality of eigenvectors at time points 0 to 2 are compared, changes are small in the first and second eigenvectors from the left, and changes are great in the third and subsequent eigenvectors.

(Total Number Estimator 155)

Total number estimator 155 estimates, based on the change information calculated by change information calculator 154, the number of living bodies to be the number of eigenvectors having a change in the direction less than a predetermined value, among a plurality of eigenvectors at the latest time point among a plurality of time points.

In the example illustrated in FIG. 11, the first and second eigenvectors from the left have barely changed, and thus total number estimator 155 can estimate that the number of living bodies is two.

The following describes the reason why such estimation is possible. In general, each of the plurality of eigenvectors indicates a propagation path of radio waves transmitted from a transmission antenna element to a reception antenna element; that is, one of the paths. According to the present variation $M_R$ eigenvectors are calculated, and each of the $M_R$ eigenvectors indicates one of the paths of radio waves transmitted from a single transmission antenna element to $M_R$ reception antenna elements. In addition, under ordinary circumstances, the paths include various paths such as a direct wave, reflection derived from a fixed object such as a wall, etc., and the paths respectively correspond to eigenvectors. However, in the present variation, since, living body information calculation unit 12 removes a component which does not include living body information, paths that can be observed are only a path reflected by living body 50 and a path corresponding to noise, which are indicated by the eigenvectors. As illustrated in FIG. 11, among a plurality of eigenvectors corresponding to the path reflected by living body 50 and the path corresponding to noise, an eigenvector corresponding to a path reflected by a living body is affected by a vibration of the living body and changes in direction with approximately several Hz (in other words, the direction barely changes). Meanwhile, an eigenvector corresponding to noise changes in direction non-periodically and randomly, due to thermal noise or the like.

It should be noted that the method with which change information calculator 154 calculates change information and total number estimator 155 estimates the number of living bodies, namely, the eigenvector variation searching method is not limited to the above-described method using mapping. The following describes the details thereof.

Change information calculator 154 may calculate, as change information, a product (for example, an inner product) of eigenvectors calculated by computing unit 13A at different time points among a plurality of time points. Here, for example, change information calculator 154 calculates an inner product of eigenvectors at different time points with a sufficiently small time difference, compared to a movement of a living body, i.e., a vibration of several Hz typified by respiration.

For example, change information calculator 154 may calculate an inner product of eigenvectors at two different time points $t_0$ and $t_1$, using an eigenvector matrix, as indicated in (Equation 4) below.

[Math. 4]

$$A = \begin{pmatrix} u_1(t_0)^H \\ \vdots \\ u_{M_R}(t_0)^H \end{pmatrix} (u_1(t_1) \ldots u_{M_R}(t_1)) = \begin{pmatrix} u_1(t_0)^H u_1(t_1) & \ldots & u_1(t_0)^H u_{M_R}(t_1) \\ \vdots & \ddots & \vdots \\ u_{M_R}(t_0)^H u_1(t_1) & \ldots & u_{M_R}(t_0)^H u_{M_R}(t_1) \end{pmatrix}$$

(Equation 4)

In this case as well, as described with reference to FIG. 11, the eigenvector corresponding to a path reflected by a living body is affected by a vibration of the living body and changes in direction with approximately several Hz. Meanwhile, an eigenvector corresponding to noise changes in direction non-periodically and randomly, due to thermal noise or the like.

In other words, variation information calculator 154, as indicated by (Equation 4), calculates an inner product of eigenvectors at two different time points. As a result, it is determined whether an eigenvector is small in change in indirection, such as the case where changes in direction of eigenvectors included in eigenvectors $U(t_0)$ at time point to and eigenvectors $U(t_1)$ at $t_1$ substantially match.

Subsequently, total number estimator 155 counts the number of eigenvectors with substantially identical directions among the eigenvectors included in eigenvectors $U(t_0)$ at time point to and eigenvectors $U(t_1)$ at $t_1$ and thereby total number estimator 155 is capable of estimating the number of eigenvectors corresponding to living bodies, i.e., the number of living bodies. More specifically, total number estimator 155 estimates that, regarding each row in matrix A as indicated in (Equation 4), when a component having a value greater than a threshold (approximately one) is present, directions of two eigenvectors corresponding to the component are identical, and changes in directions of eigenvectors at time points $t_0$ and $t_1$ are less than a predetermined value. In other words, the component corresponds to a living body, and other cases, i.e., a component having a value less than a threshold (approximately zero) corresponds to noise.

It should be noted that total number estimator 155 may calculate the sum or the maximum value for each of the rows of matrix A indicated in. (Equation 4), and estimates the number of living bodies to be the number of those having values greater than or equal to a threshold. Here, FIG. 12 is an explanatory diagram which explains the sum of each row of a result of inner product calculation of eigenvectors at two different time points according to the variation. For example, it is assumed that only $u_1(t_0)$ included in eigenvectors $U(t_0)$ at time point $t_0$ and $u_1(t_1)$ included in eigenvectors $U(t_1)$ at time point $t_1$ are eigenvectors corresponding to the paths of living body reflection. In this case, as illustrated in FIG. 12, $u_1(t_0)^H \cdot u_1(t_1)$ is approximately, and the others are approximately 0. Accordingly, when calculating the sum for each row, only the first row is approximately 1, and the others are approximately 0. In this case, estimation unit 155 may estimate the number of living bodies to be the number of rows having the sum greater than or equal to a threshold, i.e., approximately 1.

In addition, total number estimator 155 may calculate the sum or maximum value of matrix A as a whole, instead of each row, and estimate whether or not a living body is present in a detection target space, i.e., presence/absence, based on the calculated sum or maximum value is greater than or equal to a threshold.

Furthermore, in order to improve accuracy, variation information calculator 154 may calculate an inner product for a set of eigenvectors at three or more different time points, and total number estimator 155 may estimate the number of living bodies to be an average value or a median value for each row as the conclusive number of living bodies.

(Operations of Estimation Device)

Next, operations of estimation device 1 according to the present variation configured as described above will be described with reference to the drawings. The outline of estimation processing is the same as that explained with reference to FIG. 7, and thus only Step S5 and Step S6 having different detailed processes will be explained.

Figure 13:
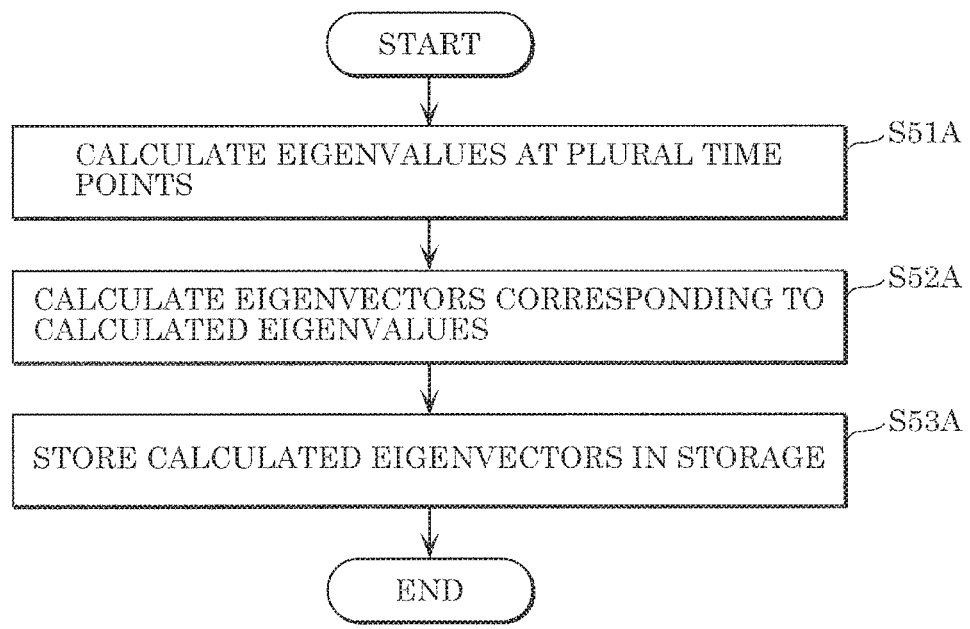
FIG. 13 is a flowchart which illustrates another example of detailed processes of step S5 illustrated in FIG. 7.

FIG. 13 is a flowchart which illustrates another example of detailed processes of Step S5 illustrated in FIG. 7.

In Step S5, estimation device 1 according to the present variation first calculates eigenvalues of a correlation matrix at each of a plurality of time points calculated in Step S4 (S51A). More specifically, estimation device 1 according to the variation calculates eigenvalues of correlation matrix $R_i$ of living-body-component channel vectors at each of a plurality of time points, which have been calculated in Step S4.

Next, estimation device 1 according to the present variation calculates eigenvectors corresponding to calculated eigenvalues (S52A). More specifically, estimation device 1 according to the variation performs eigenvalue decomposition, for example, to calculate eigenvectors for the respective eigenvalues of correlation matrix $R_i$ at each of a plurality of time points, which has been calculated in Step S51A.

Then, estimation device 1 according to the present variation causes storage 14 to store the calculated eigenvectors (S53A). More specifically, estimation device 1 according to the present variation causes storage 14 to store the calculated eigenvectors together with the time points at which the observation is carried out.

Figure 14:
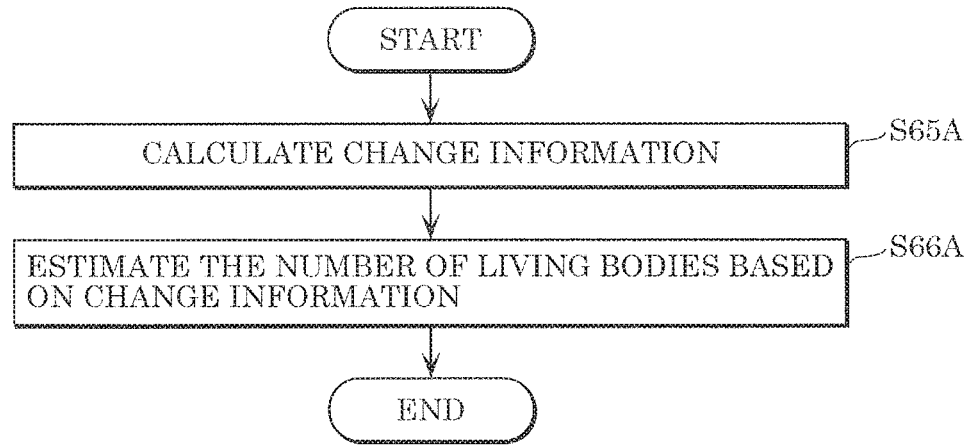
FIG. 14 is a flowchart which illustrates another example of detailed processes of step S6 illustrated in FIG. 7.

FIG. 14 is a flowchart which illustrates another example of detailed processes of step S6 illustrated in FIG. 7.

In Step S6, estimation device 1 according to the present variation first calculates variation information (S65A). More specifically, estimation device 1 according to the present variation calculates variation information indicating whether a change in a direction of corresponding eigenvectors at a plurality of time points, which are calculated in Step S52A is greater than or less than a predetermined value.

Next, estimation device 1 according to the present variation estimates the number of living bodies that is the number of people present in a detection target space, based on the calculated variation information (S66A). More specifically, estimation device 1 according to the present variation estimates, based on the variation information calculated in Step S65A, the number of living bodies to be the number of eigenvectors having the change in the direction less than a predetermined value.

Figure 15:
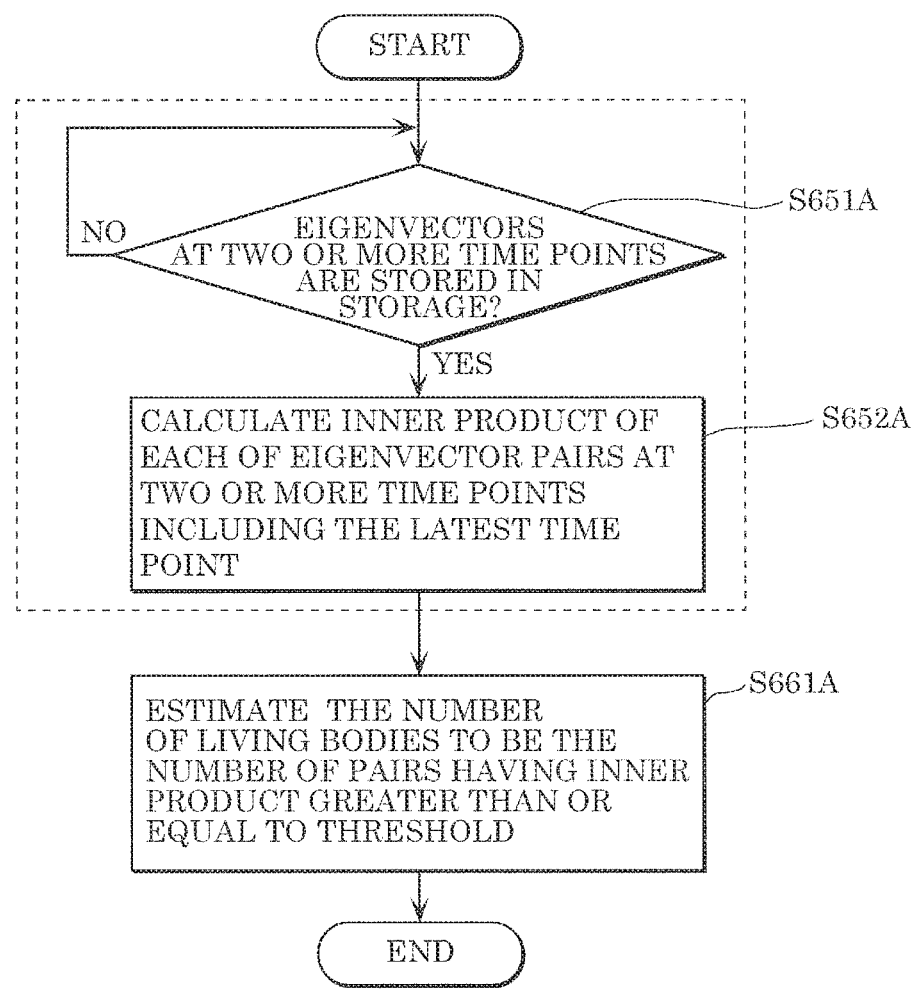
FIG. 15 is a flowchart which illustrates one example of the case where the detailed processes illustrated in FIG. 14 are performed using an inner product.

It should be noted that the method of calculating variation information in Step S65A and the method of estimating the number of living bodies in Step S66, namely the eigenvector variation searching method are not limited to the above-described method using mapping, and may be a method using an inner product of eigenvectors at different time points. FIG. 15 illustrates detailed processing when the method using an inner product is employed.

FIG. 15 is a flowchart which illustrates one example of the case where the detailed processes illustrated in FIG. 14 are performed using an inner product. More specifically, in Step S65A, estimation device 1 according to the present variation first checks whether or not eigenvectors at two or more time points are stored in storage 14 (S651A). When eigenvectors at two or more time points are stored (Yes in S651A), estimation device 1 according to the present variation calculates an inner product of each pair of eigenvectors at two or more time points including the latest time point (S652A). More specifically, estimation device 1 according to the present variation calculates an inner product for each pair of eigenvector matrices at two or more different time points, that is, an inner product for each eigenvector matrix at two different time points.

In addition, in Step S66A, estimation device 1 according to the present variation estimates the number of living bodies to be the number of pars having an inner product greater than or equal to a threshold (S661A). More specifically, when a component having a value greater than a threshold. (approximately 1) is present, for each row of a matrix composed of products of eigenvector matrix at, each of two different time points, estimation device 1 according to the present variation estimates the number of living bodies to be the number of such components.

(Advantageous Effects, etc.)

With estimation device 1 and the estimation method according to Embodiment 1 and the variation thereof, it is possible to estimate the number of living bodies, etc., which are present in a target space, by using a wireless signal. More specifically, a variation component caused by a living body is extracted based on complex transfer functions between one transmission antenna element and each of N reception antenna elements, and a correlation matrix and eigenvalues of the correlation matrix are calculated based on the extracted variation component. The number of living bodies is estimated using the calculated eigenvalues, in a predetermined method, thereby making it possible to estimate the number of living bodies, etc., which are present in a target space, by using a wireless signal. As a result, it is possible to also perform presence/absence estimation which indicates whether or not a living body is present in the target space, by using a wireless signal.

In addition, with estimation device 1 and the estimation method according to Embodiment 1 and the variation, since only a component related to a living body is extracted from a reception signal. It is possible to estimate the number of living bodies, i.e., the number of people, without making a living body who is the detection target carry a particular device such as a transmission unit, or the like. In addition, with estimation device 1 and the estimation method according to Embodiment 1 and the variation, the number of people is estimated using a feature of an eigenvalue distribution, or changes in direction of corresponding eigenvectors at a plurality of time points.

Accordingly, it is possible to estimate the number of people even when a distance from a living body who is the detection target increases and eigenvalues decrease as a whole, yielding an advantageous effect that the number of people can be estimated in a broader detection range.

It has been described that, with estimation device 1 and the estimation method according to Embodiment 1, the number of living bodies is estimated based on a feature of an eigenvalue distribution, as a predetermined method using eigenvalues of a correlation matrix calculated based on an extracted variation component. In addition, it has been described that, with estimation device 1 and the estimation method according to the variation, the number of living bodies is estimated based on changes in a direction of corresponding eigenvectors at different time points, i.e., change information, as a predetermined method using eigenvalues of a correlation matrix calculated based on an extracted variation component. However, the present disclosure is not limited to this example. Estimation device 1 and the estimation method according to Embodiment 1 and the variation may apply direction-of-arrival estimation such as Capon method to a correlation matrix calculated based on an extracted variation component, and estimate the number of people to be the number of incoming waves.

In addition, estimation device 1 and the estimation method according to Embodiment 1, etc. may further perform high-precision direction-of-arrival estimation such as MUSIC method using a correlation matrix calculated based on an extracted variation component and an estimated number of people. With this, it is possible to perform direction estimation or location estimation of a living body present in a detection target space. In other words, it is possible to estimate a living body location which is a location at which a living body is present in a target space, by using a wireless signal.

In addition, by sequentially performing the processes of such location estimation, it is also possible to track the location of a living body, together with the number of living bodies. With this, it is possible to know, in real time, a living-body location of a living body present in a target space, by using a wireless signal.

Embodiment 2

Embodiment 1 has been described taking as an example the case where a transmission unit and a reception unit of the SIMO configuration are used. However, the present disclosure is not limited to this example. The number of living bodies present in a detection target space may be estimated by: observing a correlation matrix of reception signals using a transmission unit and a reception unit of a multiple input multiple output (MIMO) configuration; and performing a predetermined method using eigenvalues of the correlation matrix. This case will be described as Embodiment 2 below.

Estimation device 1A according to Embodiment 2 will be described below with a focus on the differences from Embodiment 1.

Figure 16:
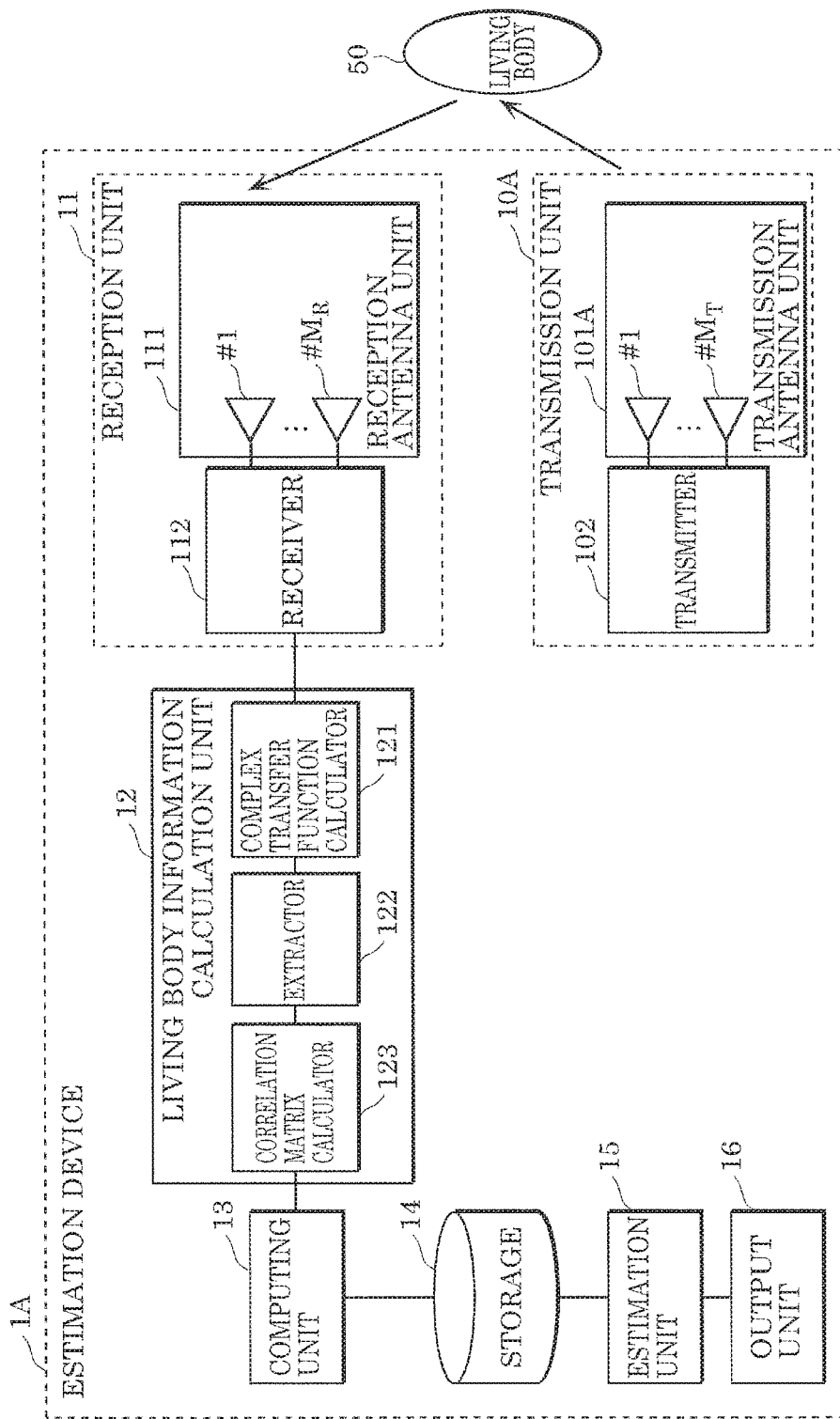
FIG. 16 is a block diagram which illustrates one example of the configuration of an estimation device according to Embodiment 2.

FIG. 16 is a block diagram which illustrates one example of a configuration of estimation device 1A according to Embodiment 2. Estimation device 1A illustrated in FIG. 16 differs from estimation device 1 of Embodiment 1 in the configuration of transmission unit 10A.

(Transmission Unit 10A)

Transmission unit 10A includes transmission antenna unit 101A and transmitter 102.

Transmission antenna unit 101A includes a plurality of transmission antenna elements. According to the present embodiment, transmission antenna unit 101A includes, for example, $M_T$ antenna elements ($M_T$ is an integer greater than or equal to 2) from #1 to #$M_T$ as illustrated in FIG. 16.

Transmitter 102 transmits a transmission signal that is a generated signal, from $M_T$ transmission antenna elements included by transmission antenna unit 101A.

It should be noted that, as a result of including a plurality of transmission antenna elements in transmission antenna unit 101A, only equations used in the eigenvector variation searching method change.

More specifically, computing unit 13 calculates eigenvectors based on eigenvalues of the correlation matrix calculated by correlation matrix calculator 123. In this case, computing unit 13 may perform eigenvalue decomposition as indicated in (Equation 5) below, thereby calculating eigenvector U(i) at time point i at which the observation is carried out. Eigenvector U(i) can be represented using (Equation 5) to (Equation 7).

Here, eigenvector U(i) at time point i at which the observation is carried out can be represented using (Equation 5) to (Equation 7). In (Equation 5), H is an operator representing Hermitian matrix.

[Math. 5]

$$R_i = U_i \Lambda_i U_i^H \quad \text{(Equation 5)}$$

[Math. 6]

$$U_i = [U_1, \ldots, U_L, U_{L+1}, \ldots, U_{M_R \times M_T}] \quad \text{(Equation 6)}$$

[Math. 7]

$$\Lambda_i = \text{diag}[\lambda_1, \ldots, \lambda_L, \lambda_{L+1}, \ldots, \lambda_{M_R \times M_T}] \quad \text{(Equation 7)}$$

In addition, estimation unit 15 calculates, as change information, a product (for example, an inner product) of eigenvectors calculated by computing unit 13 at different time points among a plurality of time points. In this case, estimation unit 15 may calculate an inner product of two eigenvectors at different time points $t_0$ and $t_1$ as indicated by (Equation 8) below

[Math. 8]

$$A = \begin{pmatrix} u_1(t_0)^H \\ \vdots \\ u_{M_R \times M_T}(t_0)^H \end{pmatrix} \begin{pmatrix} u_1(t_1) & \ldots & u_{M_R \times M_T}(t_1) \end{pmatrix} = \\ \begin{pmatrix} u_1(t_0)^H u_1(t_1) & \ldots & u_1(t_0)^H u_{M_R \times M_T}(t_1) \\ \vdots & \ddots & \vdots \\ u_{M_R \times M_T}(t_0)^H u_1(t_1) & \ldots & u_{M_R \times M_T}(t_0)^H u_{M_R \times M_T}(t_1) \end{pmatrix} \quad \text{(Equation 8)}$$

In this case as well, the eigenvector corresponding to a path reflected by a living body is affected by a vibration of the living body and changes in direction with approximately several Hz, as described above. Meanwhile, an eigenvector corresponding to noise changes in direction non-periodically and randomly, due to thermal noise or the like. Accordingly, it is possible to estimate the number of living bodies according to the above-described eigenvector variation searching method.

(Advantageous Effects, etc.)

With estimation device 1A and the estimation method according to Embodiment 2, it is possible to estimate the number of living bodies, etc., which are present in a target space, by using a wireless signal. More specifically, a variation component caused by a living body is extracted based on complex transfer functions between a plurality of transmission antenna elements and each of N reception antenna elements, and a correlation matrix and eigenvalues of the correlation matrix are calculated based on the extracted variation component. The number of living bodes is estimated using the calculated eigenvalues, in a predetermined method, thereby making it possible to estimate the number of living bodies, etc., which are present in a target space, by using a wireless signal. As a result, it is possible to also perform presence/absence estimation which indicates whether or not a living body is present in the target space, by using a wireless signal.

In addition, with estimation device 1A and the estimation method according to Embodiment 2 as well, since only a component related to a living body is extracted from reception signals as with estimation device 1, etc., of Embodiment 1, it is possible to estimate the number of living bodies, i.e., the number of people, without making a living body who is the detection target carry a particular device such as a transmission unit, or the like. In addition, with estimation device 1A and the estimation method according to Embodiment 2 as well, the number of people is estimated using a feature of an eigenvalue distribution, or changes in direction of corresponding eigenvectors at a plurality of time points. Accordingly, it is possible to estimate the number of people even when a distance from a living body who is the detection target increases and eigenvalues decrease as a whole, yielding an advantageous effect that the number of people can be estimated in a broader detection range.

In addition, since transmission unit 10A includes two or more transmission antenna elements according to Embodiment 2, it is possible to estimate a location at which a living body is present as well as the number of living bodies. More specifically, when a transmission unit includes two or more transmission antenna elements, it is possible to further estimate a location at which at least one living body is present, by estimating, at least twice, a direction in which the at least one living body is present, relative to a location of reception unit 11, using the correlation matrix calculated by correlation matrix calculator 123 and the number of living bodies estimated by estimation unit 15.

In addition, it is possible to track the location of the at least one living body for a predetermined duration, by performing the estimating of the location for the predetermined duration.

It should be noted that although the estimation device and the estimation method according to one or more aspects of the present disclosure have been described based on the aforementioned embodiments, the present disclosure is not limited to such embodiments. Other forms in which various modifications apparent to those skilled in the art are applied to the embodiments, or forms structured by combining structural components of different aspects of the embodiments may be included within the scope of the present disclosure, unless such changes and modifications depart from the scope of the present disclosure.

Furthermore, the present disclosure can be implemented not only as an estimation device including such characteristic structural components, but also as an estimation method, etc., including, as steps, the characteristic structural components included in the estimation device. In addition, the present disclosure can also be implemented as a computer program causing a computer to execute each of the characteristic steps included in such a method. Furthermore, it should be understood that such a computer program can be distributed via a non-transitory computer-readable recording medium such as a CD-ROM, or a communication network such as the Internet.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an estimation method and an estimation device, etc., for estimating the number of living bodies using a wireless signal, and in particular to an estimation method and an estimation device for use in home appliance electrical devices that performs control according to presence or absence or the number of living bodies, a monitoring device that detects intrusion of a living body, etc.

What is claimed is:

1. An estimation method of estimating a number of living bodies that are present in a space and include at least one living body, the estimation method using (i) a transmission unit including at least one transmission antenna element and (ii) a reception unit including N reception antenna elements where N is a natural number greater than or equal to two, the estimation method comprising:
calculating a plurality of complex transfer functions, based on reception signals respectively received by the N reception antenna elements during a predetermined period, the plurality of complex transfer functions each representing propagation characteristics between the at least one transmission antenna element and the N reception antenna elements;
extracting a variation component corresponding to each of the N reception antenna elements, from the plurality of complex transfer functions calculated in the calculating of the plurality of complex transfer functions, the variation component being caused by the at least one living body;
calculating a correlation matrix based on the variation component corresponding to each of the N reception antenna elements extracted in the extracting;
calculating eigenvalues of the correlation matrix calculated in the calculating of the correlation matrix; and
estimating the number of living bodies in a predetermined method, based on a distribution of the eigenvalues calculated, wherein the distribution of the eigenvalues is ratio information which indicates ratios or differences between adjacent eigenvalues.

2. The estimation method according to claim 1, wherein in the estimating of the number of living bodies, the number of living bodies is estimated based on a feature of the distribution of the eigenvalues in which the eigenvalues calculated in the calculating of the eigenvalues are sorted by magnitude.

3. The estimation method according to claim 2, wherein the distribution of the eigen values is ratio information indicating the ratios or differences between the adjacent eigenvalues among the eigenvalues calculated in the calculating of the eigenvalues when the eigenvalues are sorted by magnitude,
the feature is whether a ratio or difference included in the ratio information at an xth eigenvalue from a largest eigenvalue is greater than or equal to a predetermined value, where x is a natural number, and
in the estimating of the number of living bodies, the number of living bodies is estimated to be the natural number indicated by x.

4. The estimation method according to claim 1, wherein in the calculating of the eigenvalues, the eigenvalues of the correlation matrix calculated in the calculating of the correlation matrix at each of consecutive time points are calculated, and eigenvectors respectively corresponding to the eigenvalues of the correlation matrix at the consecutive time point are calculated, and
in the estimating of the number of living bodies, the number of living bodies is estimated based on change information regarding the eigenvectors calculated in the calculating of the eigenvalues, the change information being obtained by comparing corresponding eigenvectors at the consecutive time points, among the eigenvectors.

5. The estimation method according to claim 4, wherein the change information indicates whether a change in a direction of each of the corresponding eigenvectors at the consecutive time points is greater than or less than a predetermined value, and
in the estimating of the number of living bodies, the number of living bodies is estimated, based on the change information, to be the number of eigenvectors having the change in the direction less than the predetermined value.

6. The estimation method according to claim 1, further comprising:
outputting absence information indicating absence of a living body in the space when the number of living bodies estimated in the estimating of the number of living bodies is zero.

7. The estimation method according to claim 1, further comprising:
when the number of living bodies continues to be estimated to be an identical number for at least a predetermined period of time in the estimating of the number of living bodies, outputting the identical number as the number of living bodies.

8. The estimation method according to claim 1, further comprising:
when the transmission unit includes two or more transmission antenna elements each being the at least one transmission antenna element,
estimating a location of the at least one living body by estimating, at least twice, a direction in which the at least one living body is present, relative to a location of the reception unit, using the correlation matrix calculated in the calculating of the correlation matrix and the number of living bodies estimated in the estimating of the number of living bodies.

9. The estimation method according to claim 8, wherein in the estimating of the location, the location of the at least one living body is continuously tracked for a predetermined duration, by continuously performing the estimating of the location for the predetermined duration.

10. A non-transitory computer-readable recording medium for use in a computer, the recording medium having a computer program recorded thereon for estimating a number of living bodies that are present in a space and include at least one living body, using (i) a transmission unit including at least one transmission antenna element and (ii) a reception unit including N reception antenna elements where N is a natural number greater than or equal to two, the computer program causing the computer to execute:

calculating a plurality of complex transfer functions, based on reception signals respectively received by the N reception antenna elements during a predetermined period, the plurality of complex transfer functions each representing propagation characteristics between the at least one transmission antenna element and the N reception antenna elements;

extracting a variation component corresponding to each of the N reception antenna elements, from the plurality of complex transfer functions calculated in the calculating of the plurality of complex transfer functions, the variation component being caused by the at least one living body;

calculating a correlation matrix based on the variation component corresponding to each of the N reception antenna elements extracted in the extracting;

calculating eigenvalues of the correlation matrix calculated in the calculating of the correlation matrix; and estimating the number of living bodies in a predetermined method, based on a distribution of the eigenvalues calculated, wherein the distribution of the eigenvalues is ratio information which indicates ratios or differences between adjacent eigenvalues.

11. A computer configured to estimate a number of living bodies that are present in a space which includes at least one living body, and includes (i) a transmission unit including at least one transmission antenna element and (ii) a reception unit including N reception antenna elements where N is a natural number greater than or equal to two, the computer comprising: a processor configured to:

calculate a plurality of complex transfer functions, based on reception signals respectively received by the N reception antenna elements during a predetermined period, the plurality of complex transfer functions each representing propagation characteristics between the at least one transmission antenna element and the N reception antenna elements;

extract a variation component corresponding to each of the N reception antenna elements, from the plurality of complex transfer functions calculated, the variation component being caused by the at least one living body;

calculate a correlation matrix based on the variation component corresponding to each of the N reception antenna elements extracted;

calculate eigenvalues of the correlation matrix; and estimate the number of living bodies in a predetermined method, based on a distribution of the eigenvalues calculated, wherein the distribution of the eigenvalues is ratio information which indicates ratios or differences between adjacent eigenvalues.

\* \* \* \* \*